Feb. 8, 1927.  1,616,659
J. A. HEANY
FRICTION BRAKE
Filed May 17, 1920

INVENTOR
JOHN ALLEN HEANY
BY
Edward C. Sarnett
ATTORNEY

Patented Feb. 8, 1927.

1,616,659

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

FRICTION BRAKE.

Application filed May 17, 1920. Serial No. 381,907.

This invention relates to friction brakes and clutch devices, and particularly to a readily-removable friction surface for use in such devices.

The ordinary method heretofore employed for attaching the friction material in place in the brake mechanism of the type used in automobiles has consisted in riveting the strip of material directly to the brake band or drum. This has been the occasion of great difficulty in making replacements, as the linings became worn so that, unless the facilities of a machine shop equipped for the purpose were available, a great deal of time was wasted in performing what should be a simple operation capable of being taken care of by an operator having no particular skill and with simple tools commonly found in an automobile driver's tool box.

It is the object of the present invention to provide a friction brake construction in which the objectionable feature referred to is eliminated by permanently attaching the friction material to a metal support which is in turn capable of being mounted, in a detachable manner, in its operable position on the band or drum of the brake mechanism. In addition to thus providing for quickly mounting a friction braking element in place of the mechanism, I also provide for attaching the friction material, of which asbestos is a principal ingredient, in place and binding it together into a homogeneous mass by means of a refractory and impervious material such as a phenolic condensation product of the condensite or bakelite type. I find that a friction material of the composition indicated is not only extremely resistant to mechanical stress and strain, but it is also oil, water and heat proof. In addition to this, the phenolic product employed as a binder is a good conductor of heat and acts to freely transmit to the supporting members heat generated in the material, thereby preventing the production of heat sufficient to produce deterioration in the braking parts.

Figure 1:
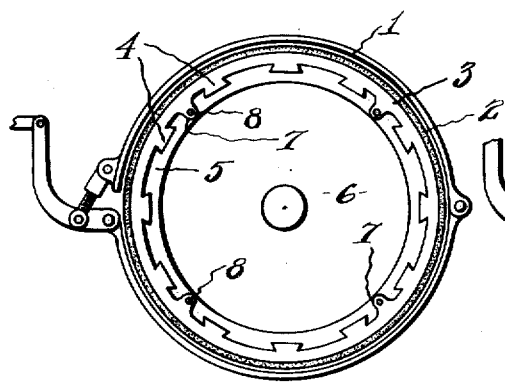
Figure 1 is a diagrammatic view of a drum brake of the external type which embodies the invention.
Figure 5:
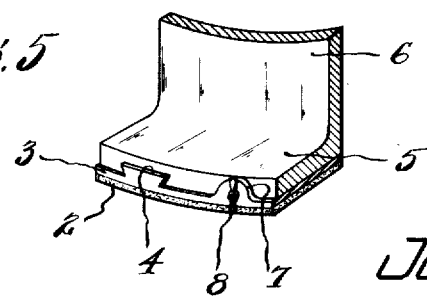
Figure 5 is an enlarged detailed view, showing an attaching device forming part of the invention.

Referring to the drawing, there is shown in Figure 1 a friction brake of the drum type in which a metallic band 1 is arranged to be contracted into clamping frictional engagement with a ring 2 of my improved asbestos brake material which is permanently attached to a removable or detachably mounted supporting member 3. The supporting member 3 takes the form of a ring provided with inwardly-directed dovetail keys or tongues 4 extending across the ring and formed to enter complementary shaped slots or grooves in an axially-extending peripheral flange 5 on the brake drum 6. The dovetail tongue and groove arrangement not only provides an interlocking connection but, as will be seen in Figure 5, also provides a wedging action by means of which an extremely rigid and firm attachment of the supporting member 3 on the drum 6 is obtained. As is apparent from Fig. 5, above referred to, the inclined sides of the dovetailed tongue tend to wedge against the corresponding sides of the slot when the band 3 is subjected to either a radial or circumferential pull. Lugs or ears 7 formed on the supporting members 3 are arranged to receive the threaded ends of suitable bolts 8 carried by the brake drum flange 6, this arrangement providing an effective means for forcing the wedge-shaped lugs 4 into the seating grooves and holding the demountable supporting member 3 in position.

Figure 2:
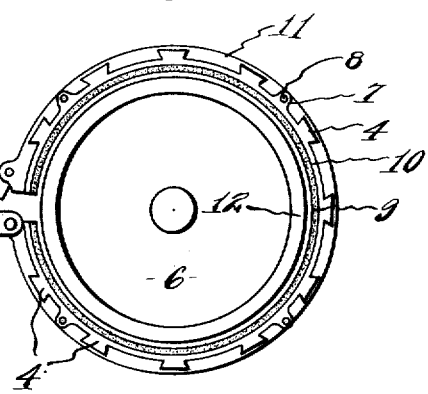
Figure 2 is a view similar to Figure 1, showing a modification of the invention.

In Figure 2 is shown a similar general arrangement in which a strip of friction material 9 is permanently secured to a demountable support 10 having dovetail connections with a contractile band 11 which can be manipulated to clamp the friction surface 9 into frictional engagement with the peripheral face of the flange 12 on the brake drum.

Figure 3:
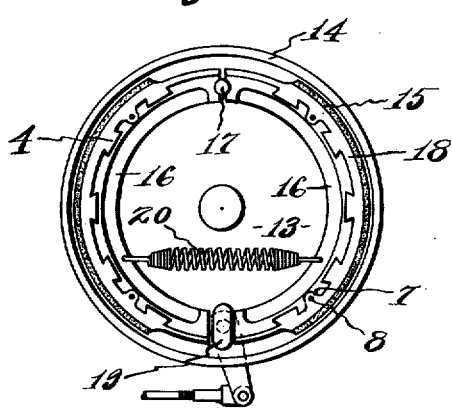
Figure 3 is a view similar to Figure 1, showing a drum brake of the internal-expansion type embodying the invention.
Figure 4:
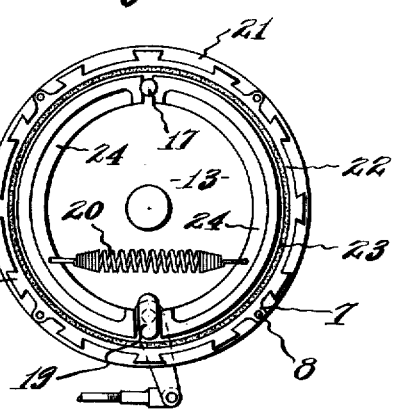
Figure 4 shows a modification of the invention shown in Figure 3.

In Figures 3 and 4 of the drawing are shown adaptations of the demountable support applied to braking devices of the internal or expansion type. In Figure 3 a drum 13 is shown having a flange 14 against the radially inner face of which the friction material 15 is arranged to be forced by the outward separating movement of a pair of arcuate arms 16 pivoted together at the point 17 and having a dovetail tongue and groove connection with the split supporting ring 18, on the outer face of which the friction material 15 is carried. A cam member 19 is adapted to be rotated in any desired manner between the adjacent ends of the arms 16 in order to force the friction material outwardly against the brake drum flange, the tensile spring 20 acting to move the arms to inoperative position when the cam member 19 is rotated to non-engaging position.

In Figure 4 of the drawing, the flange 21 of the brake drum is constructed to receive the demountable friction material supporting ring 22, which is held in place by means of tongue and groove connections and clamping means as in the forms already described. It will be seen that the friction band 23 carried by the supporting member 22 completely encloses the pivoted arcuate arms 24 which may be forced outwardly into contact with the friction material by the operation of the cam 19, as in Figure 3.

It will be seen that in each form of the invention illustrated and described a metal supporting band or ring is provided to which the friction material is permanently attached, the supporting member being capable of being detachably mounted in operative position in the brake mechanism. Preferably the friction material supporting member is made of brass or other non-corrosive metal to insure that it can be readily removed at any time for the purpose of quickly replacing worn friction material.

Another important feature of the invention resides in the means employed for attaching the friction material to its support. Preferably I make use of a cement or binder formed of a phenolic condensation product such as condensite or bakelite. I have discovered that I can in this way not only provide a secure attachment of the friction material to the surface of the support but I find that the attaching or binding material employed is impervious to the action of oil or water and also is sufficiently dense and tough to resist mechanical wear to a substantial and useful extent.

Still another advantage gained by the use of binding material of the nature described resides in its possession of heat-conducting characteristics, as a result of which heat generated in the braking surface in operation is conducted away and dissipated through the adjoining metal parts, thereby preventing the accumulation of a quantity of heat at the braking surfaces sufficient to work injury thereto. The desirable dissipation of heat referred to is greatly assisted by the intimate contact secured between the condensite or bakelite and the metal surface of the band or ring which supports the friction material.

The binding and attaching material may be incorporated with braided or woven friction material formed of wire-reinforced asbestos yarn, or it may be molded directly with asbestos or other suitable fibres without the preliminary formation of a fabric. I may, in addition to employing the adhesive qualities of the binder for attaching the friction material to the support, also make use of rivets or other supplemental attaching means, as different circumstances may require, or I may depend wholly upon the rivets as a securing means. The surface of the supporting member is preferably knurled or otherwise roughened to increase its holding capacity by increasing the effectiveness of the mechanical band between the friction material and its support.

What I claim is:

1. A brake mechanism comprising: a brake band forming a permanent part of the brake mechanism, a band of asbestos friction material arranged to engage said brake band to produce a braking operation, a metal support for the friction material, said band of friction material being cemented to the metal support with a heat-conducting cement, and means for detachably mounting said support in the brake mechanism.

2. In a brake mechanism the combination of two cooperating brake members; and a removable friction member adapted to be inserted between said brake members and means for rapidly conducting heat away from said friction member.

3. In a braking mechanism, the combination of a brake member, a friction element, a cooperating friction band, a member intermediate the friction element and the brake member, said intermediate member being fixed to the friction element and detachably secured to the brake member by means of interlocking dove-tailed tongue and slot connections, and means for locking the intermediate member to said brake member.

JOHN ALLEN HEANY.

material 15 is arranged to be forced by the outward separating movement of a pair of arcuate arms 16 pivoted together at the point 17 and having a dovetail tongue and groove connection with the split supporting ring 18, on the outer face of which the friction material 15 is carried. A cam member 19 is adapted to be rotated in any desired manner between the adjacent ends of the arms 16 in order to force the friction material outwardly against the brake drum flange, the tensile spring 20 acting to move the arms to inoperative position when the cam member 19 is rotated to non-engaging position.

In Figure 4 of the drawing, the flange 21 of the brake drum is constructed to receive the demountable friction material supporting ring 22, which is held in place by means of tongue and groove connections and clamping means as in the forms already described. It will be seen that the friction band 23 carried by the supporting member 22 completely encloses the pivoted arcuate arms 24 which may be forced outwardly into contact with the friction material by the operation of the cam 19, as in Figure 3.

It will be seen that in each form of the invention illustrated and described a metal supporting band or ring is provided to which the friction material is permanently attached, the supporting member being capable of being detachably mounted in operative position in the brake mechanism. Preferably the friction material supporting member is made of brass or other non-corrosive metal to insure that it can be readily removed at any time for the purpose of quickly replacing worn friction material.

Another important feature of the invention resides in the means employed for attaching the friction material to its support. Preferably I make use of a cement or binder formed of a phenolic condensation product such as condensite or bakelite. I have discovered that I can in this way not only provide a secure attachment of the friction material to the surface of the support but I find that the attaching or binding material employed is impervious to the action of oil or water and also is sufficiently dense and tough to resist mechanical wear to a substantial and useful extent.

Still another advantage gained by the use of binding material of the nature described resides in its possession of heat-conducting characteristics, as a result of which heat generated in the braking surface in operation is conducted away and dissipated through the adjoining metal parts, thereby preventing the accumulation of a quantity of heat at the braking surfaces sufficient to work injury thereto. The desirable dissipation of heat referred to is greatly assisted by the intimate contact secured between the condensite or bakelite and the metal surface of the band or ring which supports the friction material.

The binding and attaching material may be incorporated with braided or woven friction material formed of wire-reinforced asbestos yarn, or it may be molded directly with asbestos or other suitable fibres without the preliminary formation of a fabric. I may, in addition to employing the adhesive qualities of the binder for attaching the friction material to the support, also make use of rivets or other supplemental attaching means, as different circumstances may require, or I may depend wholly upon the rivets as a securing means. The surface of the supporting member is preferably knurled or otherwise roughened to increase its holding capacity by increasing the effectiveness of the mechanical band between the friction material and its support.

What I claim is:

1. A brake mechanism comprising: a brake band forming a permanent part of the brake mechanism, a band of asbestos friction material arranged to engage said brake band to produce a braking operation, a metal support for the friction material, said band of friction material being cemented to the metal support with a heat-conducting cement, and means for detachably mounting said support in the brake mechanism.

2. In a brake mechanism the combination of two cooperating brake members; and a removable friction member adapted to be inserted between said brake members and means for rapidly conducting heat away from said friction member.

3. In a braking mechanism, the combination of a brake member, a friction element, a cooperating friction band, a member intermediate the friction element and the brake member, said intermediate member being fixed to the friction element and detachably secured to the brake member by means of interlocking dove-tailed tongue and slot connections, and means for locking the intermediate member to said brake member.

JOHN ALLEN HEANY.

Certificate of Correction.

Patent No. 1,616,659.  Granted February 8, 1927, to

JOHN ALLEN HEANY.

It is hereby certified that error appears in the printed specification of the above-numbered patent requiring correction as follows: Page 1, line 31, for the word "of" read in; and that the said Letters Patent should be read with this correction therein that the same may conform to the record of the case in the Patent Office.

Signed and sealed this 28th day of June, A. D. 1927.

[SEAL.]

M. J. MOORE,
*Acting Commissioner of Patents.*

Certificate of Correction.

Patent No. 1,616,659.                                   Granted February 8, 1927, to

JOHN ALLEN HEANY.

It is hereby certified that error appears in the printed specification of the above-numbered patent requiring correction as follows: Page 1, line 31, for the word "of" read *in;* and that the said Letters Patent should be read with this correction therein that the same may conform to the record of the case in the Patent Office.

Signed and sealed this 28th day of June, A. D. 1927.

[SEAL.]

M. J. MOORE,
*Acting Commissioner of Patents.*